United States Patent [19]

Bellegarda et al.

[11] Patent Number: 5,828,999
[45] Date of Patent: Oct. 27, 1998

[54] METHOD AND SYSTEM FOR DERIVING A LARGE-SPAN SEMANTIC LANGUAGE MODEL FOR LARGE-VOCABULARY RECOGNITION SYSTEMS

[75] Inventors: Jerome R. Bellegarda, Los Gatos; Yen-Lu Chow, Saratoga, both of Calif.

[73] Assignee: Apple Computer, Inc., Cupertino, Calif.

[21] Appl. No.: 643,521

[22] Filed: May 6, 1996

[51] Int. Cl.⁶ .................................................. G10L 5/06
[52] U.S. Cl. .................... 704/240; 704/251; 704/231; 704/236
[58] Field of Search ............................. 395/2.6–2.66, 395/2.54

[56] References Cited

U.S. PATENT DOCUMENTS

| | | | |
|---|---|---|---|
| 4,837,831 | 6/1989 | Gillick et al. | 381/43 |
| 4,926,491 | 5/1990 | Maeda et al. | 382/14 |
| 5,072,452 | 12/1991 | Brown et al. | 381/43 |
| 5,075,896 | 12/1991 | Wilcox et al. | 382/39 |
| 5,325,298 | 6/1994 | Gallant | 364/419.19 |
| 5,477,451 | 12/1995 | Brown et al. | 364/419.08 |
| 5,491,758 | 2/1996 | Bellegarda et al. | 382/187 |
| 5,544,264 | 8/1996 | Bellagarda et al. | 382/188 |
| 5,555,344 | 9/1996 | Zunkler | 395/2.51 |
| 5,577,135 | 11/1996 | Grajski et al. | 382/253 |
| 5,594,641 | 1/1997 | Kaplan et al. | 395/601 |
| 5,608,841 | 3/1997 | Tsuboka | 395/2.65 |
| 5,627,939 | 5/1997 | Huang et al. | 395/2.65 |
| 5,638,425 | 6/1997 | Maedor, III et al. | 395/2.79 |
| 5,638,489 | 6/1997 | Tsuboka | 395/2.65 |
| 5,640,487 | 6/1997 | Lau et al. | 395/2.52 |
| 5,644,656 | 7/1997 | Akra et al. | 382/215 |

*Primary Examiner*—David R. Hudspeth
*Assistant Examiner*—Michael N. Opsasnick
*Attorney, Agent, or Firm*—Sawyer & Associates

[57] ABSTRACT

A system and method for deriving a large-span semantic language model for a large vocabulary recognition system is disclosed. The method and system maps words from a vocabulary into a vector space, where each word is represented by a vector. After the vectors are mapped to the space, the vectors are clustered into a set of clusters, where each cluster represents a semantic event. After clustering the vectors, a probability that a first word will occur given a history of prior words is computed by (i) calculating a probability that the vector representing the first word belongs to each of the clusters; (ii) calculating a probability of each cluster occurring in a history of prior words; and weighting (i) by (ii) to provide the probability.

32 Claims, 3 Drawing Sheets

METHOD AND SYSTEM FOR DERIVING A LARGE-SPAN SEMANTIC LANGUAGE MODEL FOR LARGE-VOCABULARY RECOGNITION SYSTEMS

FIELD OF THE INVENTION

The present invention relates to language modeling for speech and handwriting recognition, and more particularly to a large-span, semantically-derived statistical language model for large vocabulary speech and handwriting recognition systems.

BACKGROUND OF THE INVENTION

Speech recognizers and handwriting recognizers are two types of pattern recognizers. A speech recognizer discriminates among acoustically similar segments of speech to recognize words, while a handwriting recognizer discriminates among strokes of a pen to recognize words. Recognition systems generally operate in two modes, training and recognition. In the training mode, the systems are trained by analyzing speech, handwriting, and text data from text databases to develop statistical models that allow for variability in the way words and sentences can be pronounced or written. These models are subsequently used in the test mode for recognizing test documents.

Both types of recognizers are usually based on some finite vocabulary that restricts the words that can be recognized. Every string of words $(w_1, w_2, \ldots w_n)$ taken from the prescribed vocabulary is assigned a probability value by a (statistical) language model. In recognition, this value is interpreted as the a priori probability that the speaker/writer will say/write that string. These probabilities are employed in a dual fashion. First, they guide the search of the recognizer among various (partial) text hypotheses; second, they are a contributing factor in determining the final transcription. As such, they play a central role in the recognition process.

There are generally two types of language modeling, finite state grammar and n-gram language models. Finite state grammar language models apply rules of grammar to a series of input words to aid in predicting the current word. While the grammar rule-based approach is well-suited for small vocabulary recognition, it is not a feasible alternative for large vocabulary recognition due to computation problems.

The current approach to large vocabulary recognition is to use n-gram language models. N-gram language models compute the probability that word $w_n$ was spoken, given that it follows a history of n-1 previous words. A widely used n-gram model is the tri-gram model in which n=3. That is, the tri-gram model assigns a probability that word $w_3$ was spoken given that a history of $w_1$ and $w_2$ were observed.

One disadvantage to n-gram language models is that as n increases, the number of parameters that must be estimated quickly overwhelms the quantity of data available. Even with sophisticated parameter estimation and smoothing, it is typically not possible to go beyond n=3 with currently available databases and processing power. This, unfortunately, imposes another disadvantage, which is that the predicted word must be local with reference to the words in the history. This imposes an artificially local horizon to the language model and severely limits its predictive power, as illustrated by the following example.

Consider, for instance, predicting the word fell from the word stocks in the two equivalent phrases: "stocks fell sharply as a result of the announcement" and "stocks, as a result of the announcement, sharply fell". In the first phrase, the word fell can be predicted by an n-gram model with n=2, a straightforward proposition. Using n=2 model in the second phrase, however, does not help at all. To predict the word fell from the word stocks in the second phrase would require that n=9, which is well beyond the constraint that n be less than or equal to 3, and therefore computationally unforeseeable.

Solving this kind of problem requires taking the whole phrase into account, as opposed to just the n preceding words. This in turn leads back to parsing and the rule-based grammar approach, which the n-gram approach was trying to avoid in the first place. If the amount of training data was available in unlimited quantities, then there would be no estimation or locality of reference problem, and a true "n"-gram model would be possible. But because real-world applications are limited by the amount of training data available, the estimation and locality problems inherent in the n-gram approach persist.

The typical way to circumvent the limited data problem is to set up a class n-gram framework, which reduces the number of parameters to be eliminated, and therefore the amount of training data required. Such a framework allows factors, such as morphological information, to be taken into account through a syntactic analysis of the data. This solution, however, still suffers from the same horizon limitations mentioned earlier. To pursue the foregoing example, assume that a training database exist that contains a collection of financial news articles. The database includes many documents containing words such as stocks, bonds, fell, decreased, rose, increased, etc.

As a result, these words will either co-occur frequently (although not necessarily with the same syntactic relationship), or appear in documents and sentences within similar semantic contexts, or both. For instance, consider the slightly modified phrase: "bonds, as a result of the announcement, sharply increased." It is intuitively appealing to postulate that the prediction of increased from bonds is related to the prediction of fell from stocks. Yet the only way to express this relationship in the classical framework would be to derive a class (n=9)-gram, which is an unworkable proposition.

What is needed therefore is a method and system for deriving a statistical language model where the effective context is expanded from n words (n≦3) to a larger span, such an entire sentence or even a whole document, without resorting to a formal parsing framework and/or syntactic analysis. The present invention addresses such a need.

SUMMARY OF THE INVENTION

The present invention provides a method and system for deriving a large-span semantic language model for a large vocabulary recognition system. The method and system maps words from a vocabulary into a vector space, where each word is represented by a vector. After the words are mapped to the space, the vectors are clustered into a set of clusters, where each cluster represents a semantic event. After clustering the vectors, a first probability that a first word will occur given a history of prior words is computed by calculating a second probability that the vector representing the first word belongs to each of the clusters; calculating a third probability of each cluster occurring in a history of prior words; and weighting the second probability by the third probability.

According to the system and method disclosed herein, the probability that a word will occur can be computed using semantic relationships found in the training database, without regard to the particular syntax used to express those semantic relationships, thereby increasing the performance of the recognition system.

DESCRIPTION OF THE INVENTION

The present invention relates to an improvement in language modeling for pattern recognition systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention is a semantically derived approach to language modeling, as opposed to a syntactic approach. More particularly, the present invention provides a method and system for deriving a large-span semantic language model for large-vocabulary recognition systems. The operating principle of the present invention is that a sentence conveys semantic information that is constructed using syntax, and that the choice of the syntax does not, for the most part, influence the semantic information. In accordance with the present invention, those words which are found to be semantically linked from the evidence presented in the training text database are related to one another, without regard to the particular syntax used to express that semantic link. In the financial news example given above, for instance, the present invention is capable of harnessing the co-occurrence evidence of the words (stocks, bonds, fell, decreased, and increased), and deriving the probability of seeing the word fell or increased given an occurrence of the word stocks or bonds, respectively, even when the words do not follow each other in the phrase.

Although the present invention will be described in a preferred embodiment in terms of a speech recognition system, those with ordinary skill in the art will realize that the language model of the present invention may be applied to handwriting recognition and pattern recognition in general.

Figure 1:
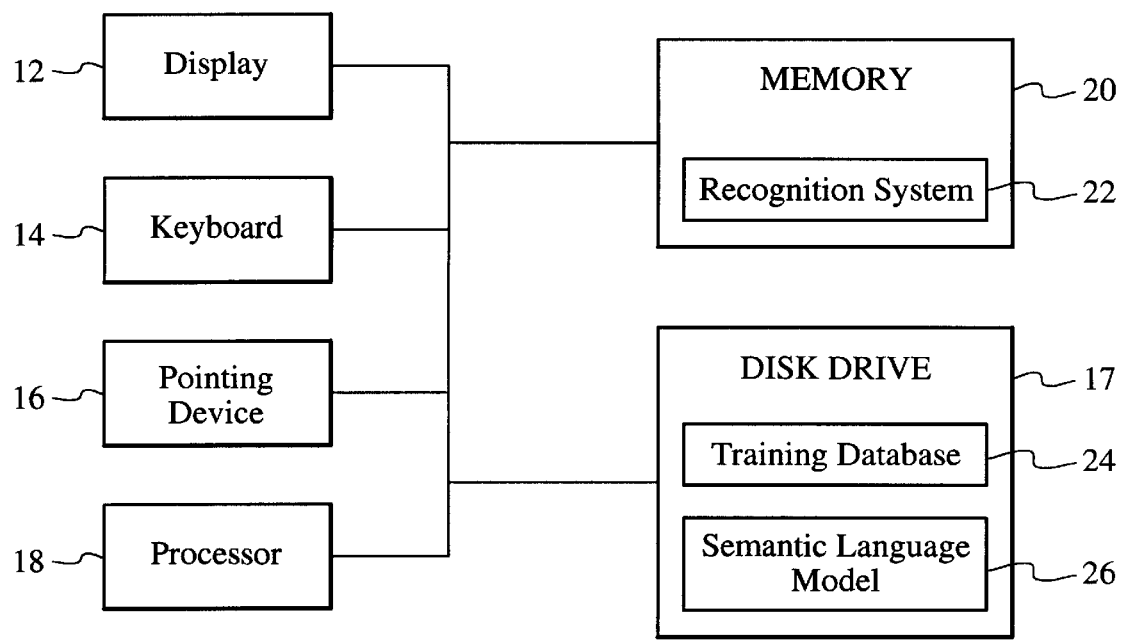
FIG. 1 is a block diagram illustrating a conventional computer system, which serves as one type of operating environment for the present invention.

FIG. 1 is a block diagram illustrating a conventional computer system 10, which serves as one type of operating environment for the present invention. The computer system 10 includes a display 12, a keyboard 14, a pointing device 16, and a disk drive 17. The computer system 10 also includes a processor 18 and a memory 20 for running a speech recognition system 22. The speech recognition system 22 operates on data from a training database 24, which may reside on the disk drive 17, and derives a large-span semantic language model 26 in accordance with the present invention. Although the speech recognition system 22 is also described as being implemented in software, the speech recognition system 22 may also be implemented in hardware. One application suited for the speech recognition system 22, whether software or hardware, is for the automatic dictation of a user's speech into various types of documents.

Figure 2:
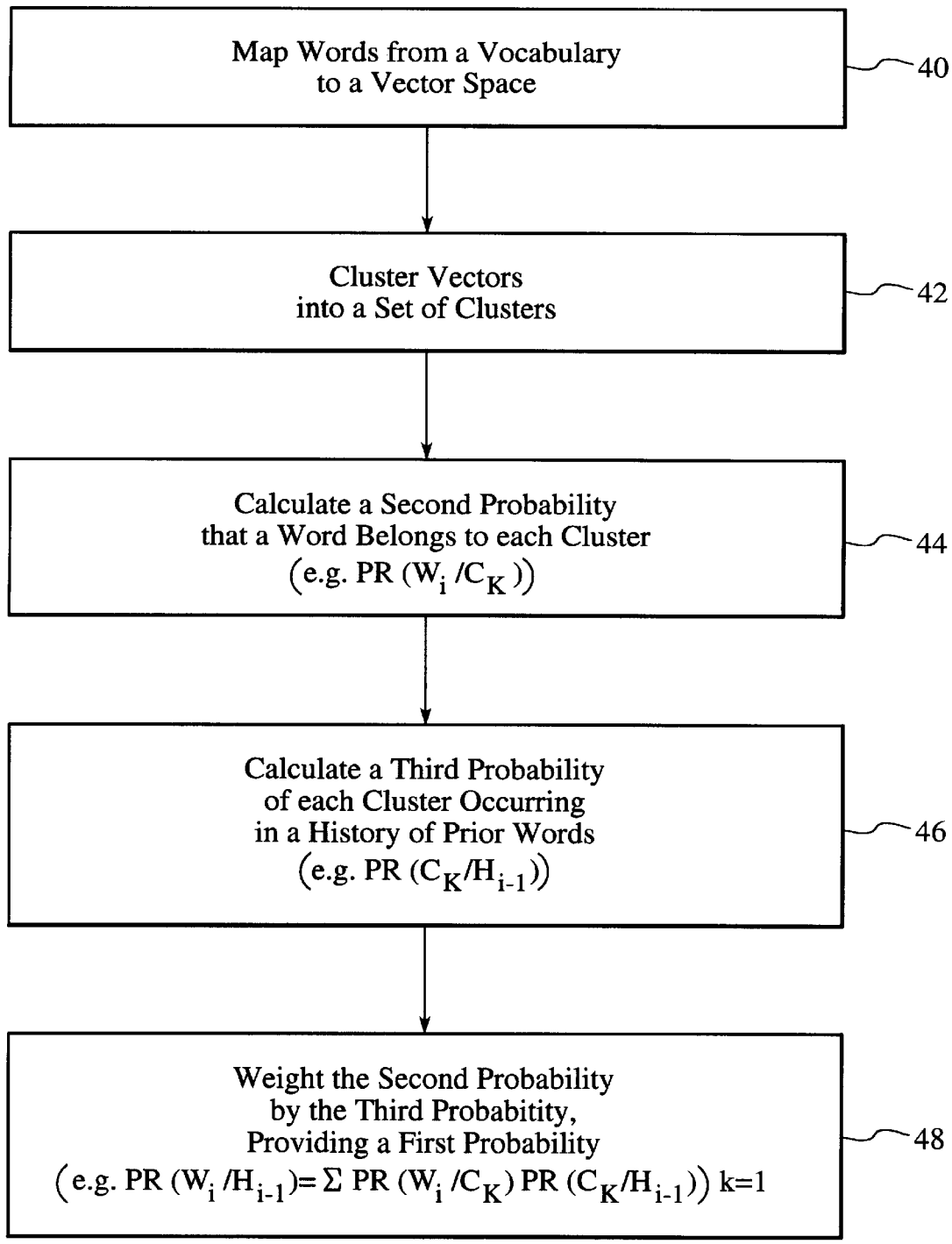
FIG. 2 is a flow chart showing the procedure a speech recognition system uses for deriving a large-span semantic language model in accordance with the present invention.

FIG. 2 is a flow chart showing the procedure the speech recognition system 22 used for deriving a large-span semantic language model 26 in accordance with the present invention. To establish a systematic framework for the large-span semantic language model 26, the words in the vocabulary of the training database 24 are mapped to a vector space of some appropriate dimension in step 40. The mapping may be performed using a modification of a paradigm first formulated in the context of information retrieval, called latent semantic analysis, which relies on a singular value decomposition of a word-document matrix.

The word-document matrix or co-occurrences matrix, tabulates the number of times each word occurs in each document. Given that the training database 24 includes N documents and a total of M words, and assuming that the words form the rows of the matrix and the documents form the columns, then each word from a row of the matrix can be represented as a single vector containing N values. These resulting vectors define a mapping between the vocabulary and a vector space of dimension (N). This mapping may be refined and made more suitable for real-world applications by performing a singular value decomposition of the matrix, in which case the vector space is reduced to a dimension R, where R<<N.

Figure 3:
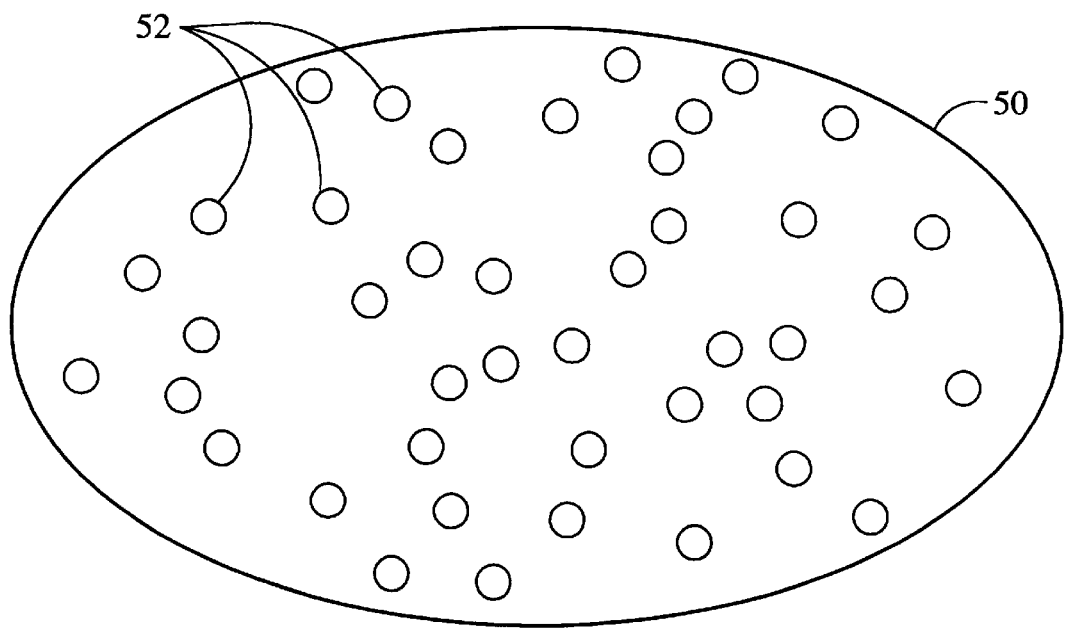
FIG. 3 is a block diagram illustrating a vector space.

FIG. 3 is a block diagram illustrating such a vector space 50. As shown, the each word vector 52 that represents a distinct word from the vocabulary occupies territory in the R-dimensional vector space 50. An important property of the vector space 50 is that two word vectors 52 which are close in distance (using some suitable metric) tend to appear in the same kind of documents, whether or not they actually occur within identical word contexts in those documents.

Figure 4:
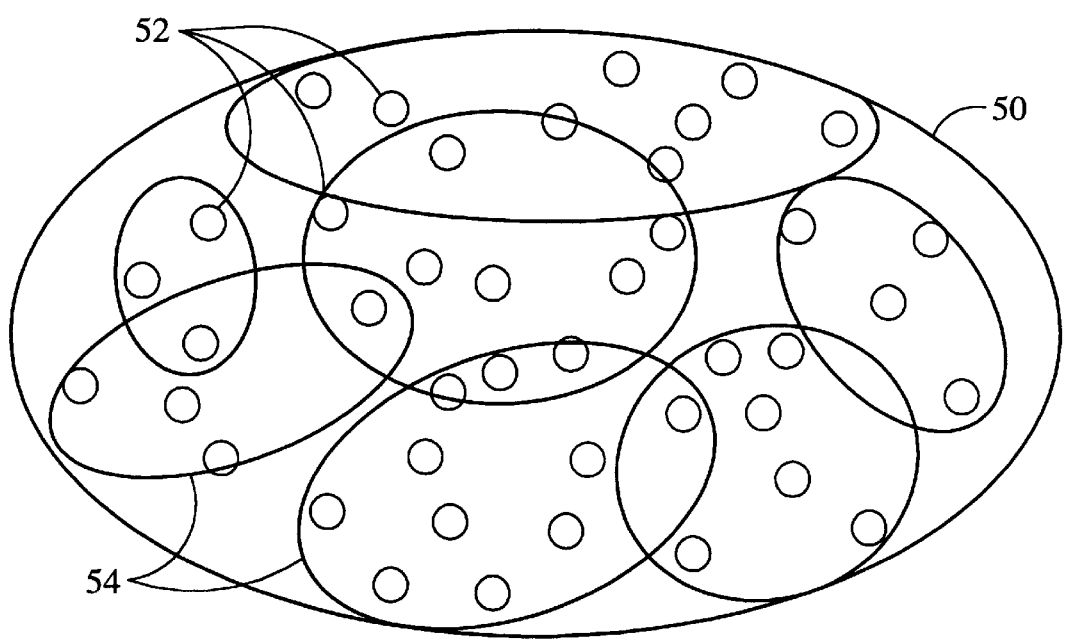
FIG. 4 is a block diagram illustrating a set of clusters in the vector space.

Referring again to FIG. 2, once the words have been mapped to the vector space 50, the word vectors 52 are clustered into a set of clusters in step 42, as shown in FIG. 4.

FIG. 4 is a block diagram illustrating a set of clusters 54 in the vector space 50. The clustering process results in a set of L clusters $C_k$ spanning the whole space 50, each of which represents a reasonably homogeneous semantic event. The clusters 54 are the basic building blocks of the large-span semantic language model 26. Each cluster 54 contains word vectors 52 that appear in the same type of documents and are therefore semantically related. What remains is to find a relationship between the word vectors 52, which is facilitated by the relative "closeness" of the word vectors 52 in the space 50.

Referring to both FIGS. 2 and 4, during recognition mode, the recognition system 22 uses the clusters 54 generated during the training mode to compute the probability that a word will occur given a history of prior words. This is done by calculating the probability that the word belongs to each of the semantic events $C_k$ in step 44, and by calculating the probability of each $C_k$ occurring in the history of prior words in step 46. The probability of the word occurring is then provided by weighting the probability that the word belongs to each of the clusters by the probability of each clusters occurring in the history of prior words in step 48.

Returning to the financial information example, a new example may help illustrate this principal. The probability that the word fell will occur given the word stocks is computed according to the present invention through the formula:

$$Pr(\text{fell}|\text{stocks}) = \sum_{k=1}^{L} Pr(\text{fell}|C_k)*Pr(C_k|\text{stocks})$$

where PR (fell|Ck) is the probability of observing fell in the semantic event represented by Ck, and PR (Ck|stocks) is a mixture coefficient indicating the probability of observing the semantic event Ck given a history containing the word stocks.

According to the present invention, the above probabilities remain the same regardless of the position of the words in the sentence. Thus, the prediction of fell from stocks is identical for both of the example phrases given above. And since a history containing the word stocks in the example is very likely to also contain the word bonds, the two values PR ($C_k$|stocks) and PR ($C_k$|bonds) will be very close, if not identical. Thus, the difference between PR (fell|stocks) and PR (increased|bonds) will essentially be determined by PR (fell|$C_k$) and PR (increased|$C_k$), i.e., the respective positions of fell and increased relative to the cluster $C_k$. But these positions can be expected to be very similar, since it is very likely that these two words themselves belong to the same cluster 54, and therefore are reasonably close to each other in the vector space 50. Hence, the present invention provides an implicit model of the semantic relationship between a given set of vocabulary words, irrespective of the bigram counts of the pairs (stocks, fell) and (bonds, increased) actually observed.

The processes of mapping words to vectors shown FIG. 2 as step 40, will now be discussed in further detail. Let T represent the training database 24 that includes a collection of N documents and articles that provide a vocabulary V of M words. Typically, M and N are on the order of ten and hundred thousand, respectively, and T might comprise a couple hundred million words. As stated above, the mapping between each word $w_i$, in V, where $_i$=1, 2, . . . , and the vector space S is accomplished by constructing a word-document matrix K associated with V and T. This is done by computing a weighted count $K_{ij}$ of $w_i$ in each of the documents $d_j$ in T. This weighted count may be expressed as:

$$K_{ij} = G_i L_{ij}$$

where $G_i$ is a global weight, indicating the overall importance of $w_i$ as an indexing term for the collection T, and $L_{ij}$ is a local value, which may reflect a possible normalization within $d_j$. The global weighting $G_i$ translates the fact that two words appearing with the same count in $d_j$ do not necessarily convey the same amount of information about the document; this is subordinated to the distribution of the words in the collection T.

Let $c_{ij}$ denote the number of times $w_i$ occurs in document $d_j$, and $t_i$ the total number of times $w_i$ occurs in the entire collection T. Then the relative frequency of $w_i$ in $d_j$ is obtained as:

$$f_{ij} = \frac{c_{ij}}{t_i}$$

and the associated normalized entropy of $w_i$ is seen to be:

$$E_i = -\frac{1}{\log(N)} \sum_{j=1}^{N} f_{ij} \log f_{ij}$$

By definition, $0 \leq E_i \leq 1$, with equality if and only if $f_{ij}$=1 and $f_{ij}$=1/N, respectively. A value of $E_i$ close to one underscores a word distributed across many documents throughout the training database 24, and therefore of little indexing value. Conversely, a value of $E_i$ close to zero indicates a word present only in a few specific documents, i.e., of suitable indexing value. Hence, $G_i$=1–$E_i$ is a reasonable global weight for the word wi. The local value $L_{ij}$ is a transformed version of $c_{ij}$ which may reflect any adjustment to the raw count $c_{ij}$. For example, it is common to use $L_{ij}$=log (1+$c_{ij}$), where the log dampens the effects of large differences in counts. It is also possible to normalize for document length. If nj denotes the number of words in document $_{dj}$, then:

$$L_{ij} = \log\left(1 + \frac{c_{ij}}{n_j}\right)$$

is such that $0 \leq L_{ij} \leq 1$. In practice, $L_{ij}$=$c_{ij}$ seems to work essentially as well as any other functional.

The (M×N) word-document matrix K with entries $K_{ij}$ describes, for the training corpus T, which words appeared in what contexts. Because not every word appears in every document, most of the N dimensions in each word vector 52 in the matrix K will have no value. Such sparsely populated vectors are not very useful because they have low resolution. The solution to this problem is to perform a singular value decomposition (SVD) of K to reduce the dimensionality of the word vectors 52, as follows:

$$K \approx \hat{K} = USV^T$$

where U is a (M×R) matrix of left singular vectors (1≦I≦M); S is the (R×R) diagonal matrix of singular values that signifies the importance of the dimensions in the word vectors 52 by listing of the singular values along the diagonal elements of the matrix in decreasing order; V is the (N×R) matrix of right singular vectors, where $v_j$ (1≦j≦N), R<<M (<<N) is the order of the decomposition; and $^T$ denotes matrix transposition. The ith left singular vector $u_i$ can be viewed as the representation of $w_i$ in a vector space of dimension R. This is the space S sought. Note that the jth right singular vector vj can be viewed as the representation of $d_j$ in the same vector space (S) of dimension R. This dimension is bounded from above by the rank of the matrix K, and from below by the amount of distortion tolerable in the decomposition. Reasonable values of R are one-hundred to two-hundred.

The idea behind the singular value decomposition (SVD) of K is that the resulting K captures the major associational structure in K and ignores higher order effects. As a result, the "closeness" of word vectors 52 in S is determined by the overall pattern of the language used in T, as opposed to specific syntactical constructs. In particular, this means that two words which do not co-occur in T will still be "close" in the vector space 50 if that is otherwise consistent with the major patterns of the language (e.g., if they tend to co-occur with a common set of words). This has the important benefit of alleviating the effects of polysemy.

After the mapping process, the word vectors 52 in the vector space 50 are clustered in step 42, as described below. In the vector space S obtained above, each word $w_i$ in V is represented by the associated left singular vector of dimension R, ui. To be able to cluster such vectors, a distance measure must be defined on S. Since the extent to which words have a similar pattern of occurrence across the entire set of documents can be inferred from:

$$KK^T = US^2U^T$$

a natural metric to consider for the distance between word vector $u_i$ and word vector $u_j$ is the cosine of the angle between $u_i$ S and $u_j$ S. Thus:

$$D(u_i, u_j) = \cos(u_i S, u_j S) = \frac{u_i S^2 u_j^T}{\|u_i S\| \|u_j S\|}$$

for any $1 \leq i,j \leq M$, where $\|\ \|$ denotes the norm operator. An example is the $L_2$ norm operator, defined as:

$$\|\bar{x}\| = \sqrt{x_1^2 + \ldots + x_n^2}$$

for all $x = (x_1 \ldots x_n)$

Once this metric is specified, it is straightforward to proceed with the clustering of the word vectors $u_i$, using any of a variety of algorithms. Since the number of word vectors 52 is relatively large, it is advisable to perform this clustering in stages, using for example, K-means and bottom-up clustering sequentially. In that case, K-means clustering is used to obtain a coarse partition of the vocabulary V in to a small set of superclusters. Each supercluster is then itself partitioned using bottom-up clustering. The result of this process is a set of clusters Ck, $1 \leq k \leq L$, each of which can be characterized by an appropriate multi variate distribution in the space S.

After clustering, the next step in the process is to derive the probabilities in the right hand side of the mixture model, shown collectively as steps 44, 46 and 48 in FIG. 2. Let $w_i$ denote a word to be predicted during recognition mode, and $H_{i-1}$ the admissible history (context) for the present document. In the case of an n-gram language model, for example, $H_{i-1} = w_{i-1} w_{i-2} \ldots w_{i-n+1}$, i.e., the last n-1 words.

According to the present invention, $H_{i-1}$ could be anything from the last n-1 words, to the current sentence, to the current document, to a particular set of reference documents in T, to the entire collection of documents in T, depending on what information is available on the dynamics of the relevant parameters. If, for example, the document considered is very typical of the collection T, there is no reason, in principle, not to use $H_{i-1} = T$.

Having an unlimited history is a major benefit of the large-span approach of the present invention. With this definition, the mixture language model is specified by:

$$PR(w_i|H_{i-1}) = \sum_{k=1}^{L} PR(w_i|C_k)PR(C_k|H_{i-1})$$

where the clusters $C_k$ result from the clustering process.

There are therefore two kinds of probability to compute. The quantity PR $(w_i|C_k)$ reflects the closeness of the distance between $w_i$ and the centroid of cluster Ck, and can therefore be obtained through the multi variate distribution mentioned above. The quantity PR $(C_k|H_{i-1})$, reflects the relevance of cluster $C_k$ given the observed history, and can therefore be obtained from the relative frequency of cluster $C_k$ in the admissible history $H_{i-1}$. Weighting the distance between $w_i$ and the centroid of cluster Ck by the relative frequency of cluster $C_k$ in the admissible history $H_{i-1}$ provides the probability for the mixture model.

A situation of practical importance occurs when $H_{i-1}$ can be partitioned into somewhat well-defined topics. For example, if $H_{i-1}$ is a collection of articles on quarterly financial results, then it could presumably be partitioned into automobile industry articles, computer industry articles, etc. In this case, the original mixture model can be modified as follows:

$$PR(w_i|H_{i-1}) = \sum_{j=1}^{P} \left( \sum_{k=1}^{L} PR(w_i|C_{jk})PR(C_{jk}|T_j, H_{i-1}) \right) PR(T_j|H_{i-1})$$

where P is the number of topics $T_j$ considered (automobile, computer, etc.).

In other words, there are now two separate levels of mixing, first at the cluster level for a given topic, and then at the topic level. As before, PR $(C_{jk}|T_j, H_{i-1})$ reflects the relative frequency of cluster $C_{jk}$ in the admissible history $H_{i-1}$, but this time only those documents relevant to the given topic are used for training data. As for PR $(T_j|H_{i-1})$, it can be obtained in a straight forward manner by computing the fraction of documents relevant to $T_j$ which are present in $H_{i-1}$.

A method and system has been disclosed for deriving a large-span semantic language model for recognition systems. Software written according to the present invention is to be stored in some form of computer-readable medium, such as memory or CD-ROM, or transmitted over a network, and executed by a processor.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for deriving a large-span semantic language model for a large vocabulary recognition system, the method comprising the steps of:
   (a) mapping words into a vector space, where each word is represented by a vector;
   (b) clustering the vectors into a set of clusters, where each cluster represents a semantic event;
   (c) computing a first probability that a first word will occur given a history of prior words by,
      (i) calculating a second probability that a vector representing the first word belongs to each of the clusters, the second probability capable of being independent of a location of the first word in a sentence;
      (ii) calculating a third probability of each cluster occurring in a history of prior words; and
      (iii) weighting the second probability by the third probability.

2. A method as in claim 1 wherein step (a) further includes the step of:
   (a)(i) tabulating the number of times each word occurs in a set of N training documents using a word-document matrix, wherein entries from the matrix form the vectors, which have dimension N.

3. A method as in claim 2 wherein step (c)(i) further includes the step of:
   (c)(i)(1) calculating a distance between the vector representing the first word and each of the clusters.

4. A method as in claim 3 wherein step (c)(ii) further includes the step of:
 (c)(ii)(1) calculating how frequently each cluster occurs in the history of prior words.

5. A method as in claim 4 wherein step (a) further includes the step of:
 (a)(ii) reducing the vectors to a dimension less than N.

6. A method as in claim 5 wherein the dimension of the vectors is reduced by performing a singular value decomposition of the word-document matrix.

7. A method as in claim 6 wherein the singular value decomposition is performed on the word-document matrix K by calculating:

$$K_= K = USV^T$$

where U is a (M×R) matrix of left singular vectors, S is a (R×R) diagonal matrix of singular values, and V is a (N×R) matrix of right singular vectors.

8. A method as in claim 7 wherein the distance between the vector representing the first word ($u_i$) and a vector representing a second word ($u_j$) is calculated by $$D(u_i, u_j) = \cos(u_i S, u_j S) = \frac{u_i S^2 u_j^T}{\|u_i S\| \, \|u_j S\|}$$

9. A method as in claim 8 wherein the first probability that the first word ($w_i$) will occur given a history of prior words ($H_{i-1}$) is calculated by $$PR(w_i|H_{i-1}) = \sum_{k=1}^{L} PR(w_i|C_k) PR(C_k|H_{i-1})$$

10. A system for deriving a large-span semantic language model comprising:
 a training database;
 a memory;
 a processor coupled to the memory; and
 a pattern recognition system executed by the process, the pattern recognition system including,
 means for mapping words from the training database into a vector space, where each word is represented by a vector, means for clustering the vectors into a set of clusters, where each cluster represents a semantic event, and
 means for computing a first probability that a first word will occur given a history of prior words by calculating a second probability that a vector representing the first word belongs to each of the clusters, calculating a third probability of each cluster occurring in a history of prior words, and by weighting the second probability by the third probability;
 wherein the second probability is capable of being independent of a location of the first word in a sentence.

11. A system as in claim 10 wherein the means for mapping includes means for tabulating the number of times each word occurs in a set of N training documents using a word-document matrix, wherein entries from the matrix form the vectors having dimension N.

12. A system as in claim 11 wherein the second probability is calculated by calculating a distance between the vector representing the first word and each of the clusters.

13. A system as in claim 12 wherein the third probability is calculated by calculating how frequently each cluster occurs in the history of prior words.

14. A system as in claim 13 wherein the means for mapping includes means for reducing the vectors to a dimension less than N.

15. A system as in claim 14 wherein the dimension of the vectors is reduced by performing a singular value decomposition of the word-document matrix.

16. A system as in claim 15 wherein the singular value decomposition is performed on the word-document matrix by calculating:

$$K_= K = USV^T$$

where U is a (M×R) matrix of left singular vectors, S is a (R×R) diagonal matrix of singular values, and V is a (N×R) matrix of right singular vectors.

17. A system as in claim 16 wherein the distance between the vector representing the first word ($u_i$) and a vector representing a second word ($u_j$) is calculated by $$D(u_i, u_j) = \cos(u_i S, u_j S) = \frac{u_i S^2 u_j^T}{\|u_i S\| \, \|u_j S\|}$$

18. A system as in claim 17 wherein the first probability that the first word ($w_i$) will occur given a history of prior words ($H_{i-1}$) is calculated by $$PR(w_i|H_{i-1}) = \sum_{k=1}^{L} PR(w_i|C_k) PR(C_k|H_{i-1})$$

19. A computer-readable medium containing program instructions for deriving a large-span semantic language model for a large vocabulary recognition system, the program instructions for:
 (a) mapping words into a vector space, where each word is represented by a vector;
 (b) clustering the vectors into a set of clusters, where each cluster represents a semantic event;
 (c) computing a first probability that a first word will occur given a history of prior words by,
  (i) calculating a second probability that a vector representing the first word belongs to each of the clusters, the second probability capable of being independent of a location of the first word in a sentence;
  (ii) calculating a third probability of each cluster occurring in a history of prior words; and
  (iii) providing the first probability by weighting the second probability by the third probability.

20. A computer-readable medium as in claim 19 wherein instruction (a) further includes an instruction for:
 (a)(i) tabulating the number of times each word occurs in a set of N training documents using a word-document matrix, wherein entries from the matrix form the vectors, which have dimension N.

21. A computer-readable medium as in claim 20 wherein instruction (c)(i) further includes an instruction for:
 (c)(i)(1) calculating a distance between the vector representing the first word and each of the clusters.

22. A computer-readable medium as in claim 1 wherein instruction (c)(ii) further includes an instruction for:
 (c)(ii)(1) calculating how frequently each cluster occurs in the history of prior words.

23. A computer-readable medium as in claim 22 wherein instruction (a) further includes an instruction for:
 (a)(ii) reducing the vectors to a dimension less than N.

24. A computer-readable medium as in claim 23 wherein the dimension of the vectors is reduced by performing a singular value decomposition of the word-document matrix.

25. A computer-readable medium as in claim 24 wherein the singular value decomposition is performed on the word-document matrix K by calculating:

$$K\_K = USV^T$$

where U is a (M×R) matrix of left singular vectors, S is a (R×R) diagonal matrix of singular values, and V is a (N×R) matrix of right singular vectors.

26. A computer-readable medium as in claim 25 wherein the distance between the vector representing the first word ($u_i$) and a vector representing a second word ($u_j$) is calculated by $$D(u_i, u_j) = \cos(u_i S, u_j S) = \frac{u_i S^2 u_j^T}{\|u_i S\| \|u_j S\|}$$

27. A computer-readable medium as in claim 26 wherein the first probability that the first word ($w_i$) will occur given a history of prior words ($H_{i-1}$) is calculated by $$PR(w_i|H_{i-1}) = \sum_{k=1}^{L} PR(w_i|C_k) PR(C_k|H_{i-1})$$

28. A method for deriving a large-span semantic language model for a large vocabulary recognition system, the method comprising the steps of:
    (a) tabulating the number of times each word occurs in a set of N training documents using a word-document matrix, wherein entries from the matrix form word vectors of dimension N;
    (b) reducing the vectors to a dimension R, where R is significantly less than N;
    (c) clustering the vectors into a set of clusters, where each cluster represents a semantic event;
    (d) calculating a distance between a vector representing a first word and each of the clusters to provide a probability that the vector representing the first word belongs to each of the clusters, the probability that the vector representing the first word belongs to each of the clusters capable of being independent of a location of the first word in a sentence;
    (e) calculating how frequently each cluster occurs in a history of prior words to provide a probability of each cluster occurring in the history of prior words; and
    (f) computing a probability that the vector representing the first word will occur given the history of prior words by weighting the probability that the vector representing the first word belongs to each of the clusters by the probability of each cluster occurring in the history of prior words.

29. A method as in claim 28 wherein the dimension of the vectors is reduced by performing a singular value decomposition of the word-document matrix.

30. A method as in claim 29 wherein the singular value decomposition is performed on the word-document matrix K by calculating:

$$K\_K = USV^T$$

where U is a (M×R) matrix of left singular vectors, S is a (R×R) diagonal matrix of singular values, and V is a (N×R) matrix of right singular vectors.

31. A method as in claim 30 wherein the distance between the vector representing the first word ($u_i$) and a vector representing a second word ($u_j$) is calculated by $$D(u_i, u_j) = \cos(u_i S, u_j S) = \frac{u_i S^2 u_j^T}{\|u_i S\| \|u_j S\|}$$

32. A method as in claim 31 wherein the first probability that the first word ($w_i$) will occur given a history of prior words ($H_{i-1}$) is calculated by $$PR(w_i|H_{i-1}) = \sum_{k=1}^{L} PR(w_i|C_k) PR(C_k|H_{i-1})$$

* * * * *

UNITED STATES PATENT AND TRADEMARK OFFICE
CERTIFICATE OF CORRECTION

PATENT NO. : 5,828,999
DATED : October 27, 1998
INVENTOR(S) : Bellegarda, et al.

It is certified that error appears in the above-identified patent and that said Letters Patent is hereby corrected as shown below:

In the claims:

In Claim 7, column 9, line 15, delete "$K_z = K =$" and insert -- $K \approx K =$ In Claim 10, column 9, line 45, please start a new paragraph after the word "vector,".

In Claim 22, column 10, line 61, delete "medium as in claim 1" and insert -- medium as in claim 21 -- .

Signed and Sealed this

Third Day of August, 1999

Attest:

Q. TODD DICKINSON

*Attesting Officer*   *Acting Commissioner of Patents and Trademarks*